(12) United States Patent
Fineto et al.

(10) Patent No.: US 12,117,085 B2
(45) Date of Patent: Oct. 15, 2024

(54) PISTON RING

(71) Applicants: Mahle International GmbH, Stuttgart (DE); Mahle Metal Leve S/A, Jundiai (BR)

(72) Inventors: Bruno Fineto, Barra Funda (BR); Rafael Antonio Bruno, Sao Paulo (BR); Rafael Bettini Rabello, Jundiai (BR); Marcelo Moura De Oliveira, Minas Gerais (BR)

(73) Assignees: Mahle International GmbH (DE); Mahle Metal Leve S/A (BR)

( * ) Notice: Subject to any disclaimer, the term of this patent is extended or adjusted under 35 U.S.C. 154(b) by 141 days.

(21) Appl. No.: 17/868,523

(22) Filed: Jul. 19, 2022

(65) Prior Publication Data

US 2024/0026971 A1 Jan. 25, 2024

(51) Int. Cl.
*F16J 15/26* (2006.01)
*F16J 9/12* (2006.01)
*F16J 9/26* (2006.01)

(52) U.S. Cl.
CPC .. *F16J 9/26* (2013.01); *F16J 9/12* (2013.01)

(58) Field of Classification Search
CPC ...................................... F16J 9/26; F16J 9/12
See application file for complete search history.

(56) References Cited

U.S. PATENT DOCUMENTS

| | | | |
|---|---|---|---|
| 7,396,018 B1* | 7/2008 | Fiedler | F16J 9/206 277/449 |
| 2004/0119242 A1* | 6/2004 | Katumaru | F16J 9/061 277/440 |
| 2006/0273525 A1* | 12/2006 | Fiedler | F16J 9/066 277/434 |
| 2007/0017459 A1* | 1/2007 | Fiedler | F16J 9/203 123/48 A |
| 2007/0018410 A1* | 1/2007 | Fiedler | F16J 9/206 277/478 |

(Continued)

FOREIGN PATENT DOCUMENTS

| JP | 2010054039 A | 3/2010 |
|---|---|---|
| JP | 2019124346 A | 7/2019 |

(Continued)

OTHER PUBLICATIONS

Extended European Search Report dated Dec. 2, 2022 for copending European App. No. EP22185784.0.

(Continued)

*Primary Examiner* — Vishal A Patel
(74) *Attorney, Agent, or Firm* — Fishman Stewart PLLC

(57) ABSTRACT

A piston ring may include a spacer or expansion element and/or two segments. The segments may have a radial dimension between approximately 1.50 mm and approximately 1.90 mm and a height between approximately 0.30 mm and approximately 0.40 mm. The segments may have a concave profile with recesses between approximately 0.015 mm and approximately 0.030 mm and a clearance of approximately 0.150 mm. The segments may be wound via a matrix box device and a roller. The piston ring may have a circularity, expressed in the form of a decomposition as a Fourier series, with an amplitude for orders higher than 10 which is not greater than 0.10 μm.

17 Claims, 6 Drawing Sheets

(56) References Cited

U.S. PATENT DOCUMENTS

| | | | |
|---|---|---|---|
| 2007/0252338 A1 | 11/2007 | Maier | |
| 2010/0090416 A1* | 4/2010 | Tomanik | F16J 9/14 |
| | | | 29/888.075 |
| 2016/0040622 A1* | 2/2016 | Donahue | F16J 9/064 |
| | | | 123/193.4 |
| 2017/0175893 A1* | 6/2017 | Fujita | F02F 5/00 |
| 2018/0038483 A1* | 2/2018 | Shimizu | F16J 9/06 |
| 2018/0209539 A1* | 7/2018 | Mittler | F16J 9/20 |
| 2019/0360585 A1* | 11/2019 | Kawano | F16J 9/20 |
| 2021/0164568 A1* | 6/2021 | Nango | F16J 9/20 |

FOREIGN PATENT DOCUMENTS

| | | | |
|---|---|---|---|
| WO | 2006071344 A1 | 7/2006 | |
| WO | 2020067539 A1 | 4/2020 | |

OTHER PUBLICATIONS

Machine English translation for WO2020/067539.
Machine English translation for JP2019124346.
Machine English translation for JP2010054039.

* cited by examiner

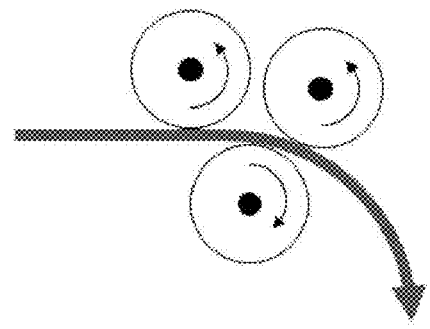
Figure 1 (State of the art)
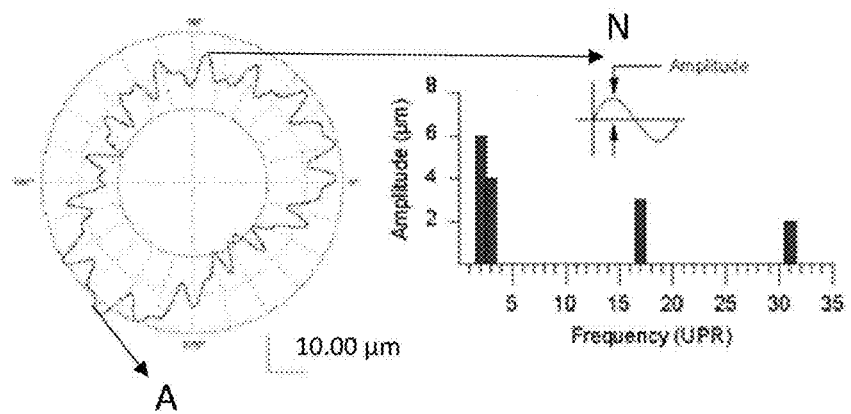
Figure 2 (State of the art)

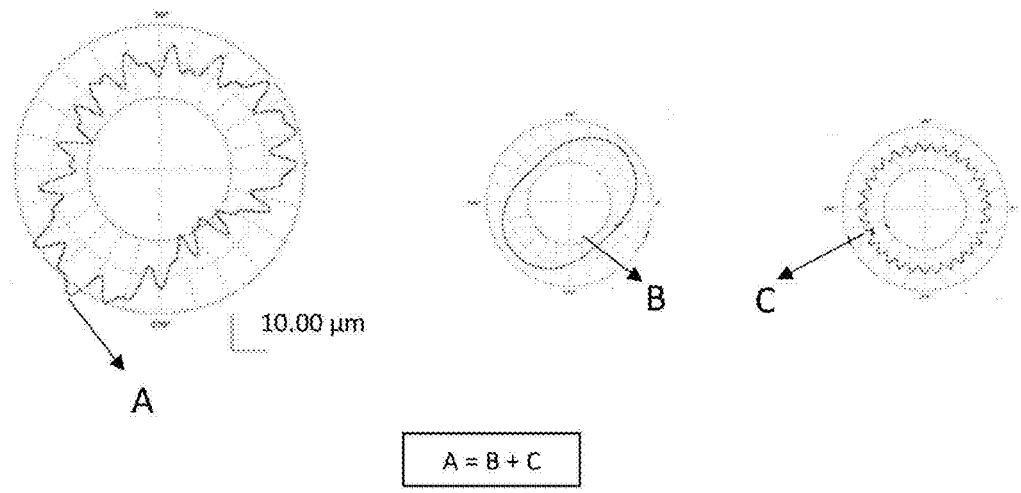
Figure 3 (State of the art)
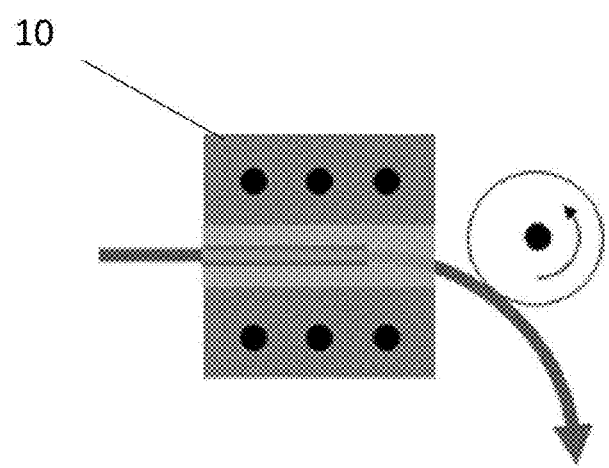
Figure 4

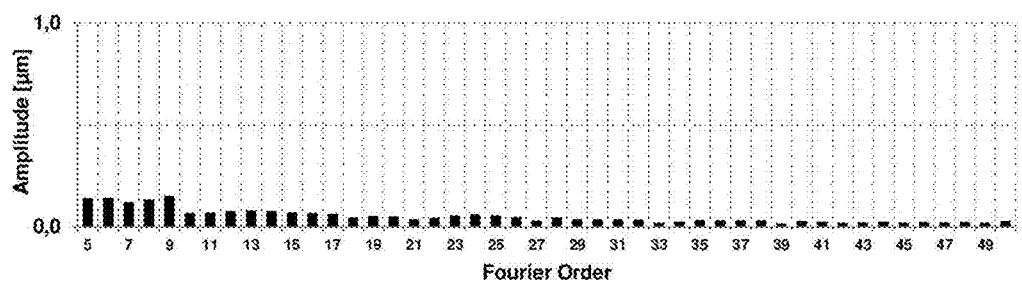
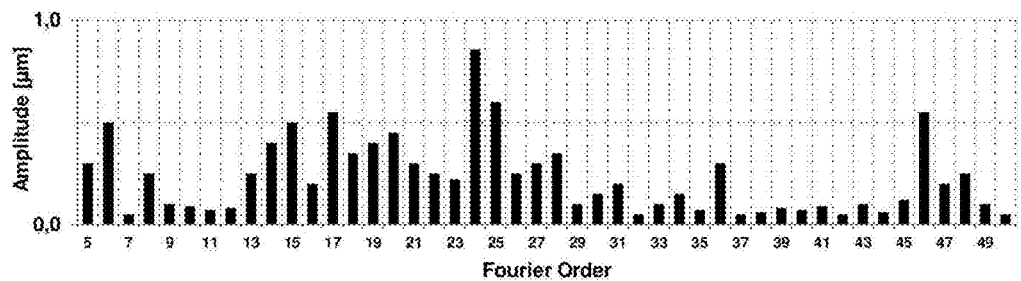
Figure 9

PISTON RING

TECHNICAL FIELD

The present invention relates to a piston ring, destined to be used for internal combustion engines, consisting of two segments and a spacer or expansion element, wherein the ring comprises an improved constructive configuration.

BACKGROUND

Internal combustion engines are mechanisms that transform energy, and are used for the majority of motor vehicles, and basically consist of two main parts: one or more engine heads and the engine block itself. The combustion chambers are situated at the base of the engine head(s) (in the case of diesel engines, the combustion chambers are usually situated in the piston heads), whereas the cylinders and the shaft for the valves or the crankshaft are situated in the engine block. The crankshaft assembly consists of pistons, rods, and the crankshaft.

The engine converts the energy produced by the combustion of a mixture (fuel and air) in the combustion chambers into mechanical energy which in turn is used to drive the wheels.

As the driving force necessary to move the motor vehicle is the result of the combustion of the mixture consisting of air and fuel in the combustion chamber, and in order to assure a homogeneous combustion without burning oil, and in order to avoid too much gas escaping from the cylinder into the crankcase, it is necessary to make use of rings in order to guarantee an adequate sealing of the space between the piston and the cylinder wall.

Over the course of the years, technological knowledge has allowed a certain degree of perfection for piston rings, as well as for production methods therefor.

The reason for this is that, keeping in mind the various advantages offered or made possible by internal combustion engines, it is necessary to continually improve these elements, guaranteeing the ever-increasing safety, durability, and efficiency of these engines.

Therefore, although they adequately meet the requirements for the engines for which they were developed, the present piston rings for internal combustion engines present a certain number of disadvantages that can be improved, more specifically when dealing with the constructive configuration.

As can be seen in FIG. 1, the piston rings from the state of the art are usually produced by means of a process using three rollers, the function of which is to carry out the winding of the segment.

It is worth noting here that the initial procedure for winding the segment is of extreme importance in attaining the form of a ring, as it is at this stage that the symmetry and the profile offset of the ring can be guaranteed.

Moreover, one of the parameters that can be used to evaluate, after the winding process of the piston ring, whether the symmetry and the offset of the profile of the ring are adequate, is the analysis of the circular character by means of a Fourier decomposition.

In other words, the analysis of the circular character by means of a Fourier decomposition of a piston ring allows the identification of a possible improved constructive configuration of the piston ring.

FIG. 2 shows the analysis of the circularity by means of a Fourier decomposition of a piston ring according to the state of the art, produced by means of a process using three rollers, in which it is possible to observe the different circularity levels and the amplitude of the Fourier orders N of an original circumferential profile A.

In further detail, as can be seen in FIG. 3, the analysis of the circularity by means of a Fourier decomposition consists of a decomposition of the original form, in other words the original circumferential profile A, using a set of predetermined forms B, C, the amplitude and the phase of which can be adjusted in such a way that the original form is reconstructed with the least possible error.

The set of predetermined forms can for example consist of a predetermined form B of a second order component, represented by two formed points on the aforementioned predetermined form B; and a predetermined form C of a 31st order component, represented by 31 formed points on the aforementioned predetermined form C.

However, the smaller the amplitudes of the figures of which the original form is composed, the more the original frame approximates a perfectly circular form, without deformations, which means that the smaller the Fourier amplitudes, the more the constructive configuration of the piston ring will be improved.

That said, and as will be described hereinafter, the state of the art does not comprise a piston ring in which the symmetry and the profile offset of the piston ring have an improved constructive configuration.

SUMMARY

A first objective of the present invention is to provide a ring with an improved constructive configuration, with which it is possible to increase the initial unit pressure of the ring at the skirt of the cylinder, allowing a low-level oil consumption during the run-in phase.

A second objective of the present invention consists of providing a ring with an improved constructive configuration, allowing a more restricted emission of particles in a new engine, or in other words, during the first hours of functioning of the engine.

A third objective of the present invention consists of providing a ring with an improved constructive configuration, allowing an improved oil consumption of the engine, and consequently a lower particle emission into the environment.

The goals and objectives of the present invention are realized by a piston ring made of steel, consisting of a spacer or expansion element, and two segments, in which the segments have a radial dimension of 1.50 mm to 1.90 mm, and a height of 0.30 mm to 0.40 mm, as well as a convex profile with recesses between 0.015 mm and 0.030 mm, with a standard measurement of 0.150 mm, the segments being wound by means of a matrix box device and a roller, wherein the ring has a circularity, expressed in the form of a decomposition as a Fourier series, with amplitudes smaller than 0.10 µm for orders higher than 10.

In an embodiment, the piston ring comprises a top with a horizontal offset up to 0.005 mm, preferably smaller than 0.002 mm.

In another embodiment, the piston ring comprises a top with an asymmetry of the size of the profile with respect to the base of up to 0.010 mm, preferably up to 0.003 mm.

In yet another embodiment, the piston ring comprises a PVD and/or a DLC layer on the contact surface of at least one segment.

In yet another embodiment, the piston ring comprises a base material made of nitrated stainless steel.

In yet another embodiment, the piston ring comprises a base material made of carbon steel.

BRIEF DESCRIPTION OF THE DRAWINGS

The present invention shall hereafter be described in more detail, wherein reference is made to an example, as can be seen in the drawings.

FIG. 1 shows a schematic representation of a winding system for a piston ring according to the state of the art;

FIG. 2 shows a representation of an analysis of circularity by means of a Fourier decomposition of a piston ring according to the state of the art;

FIG. 3 shows a representation of the decomposition of a given circularity in known parts for the Fourier decomposition;

FIG. 4 shows a schematic representation of a winding system for a piston ring according to the present invention;

FIG. 9 shows a graphic of the analysis of the Fourier orders after winding the piston ring according to the present invention, as well as of a piston ring according to the state of the art;

DETAILED DESCRIPTION

Figure 5:
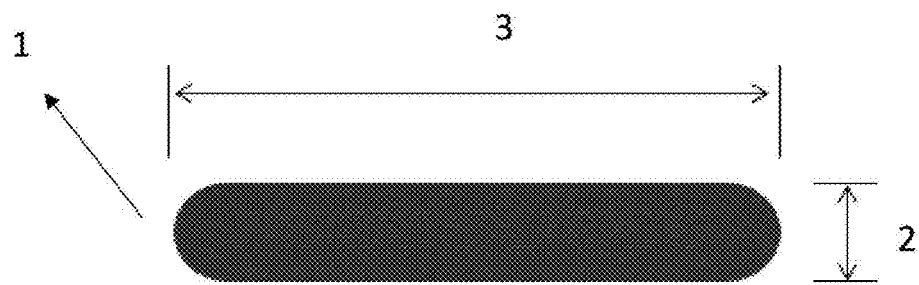
FIG. 5 shows a schematic representation of the segment of the piston ring according to the present invention.
Figure 6:
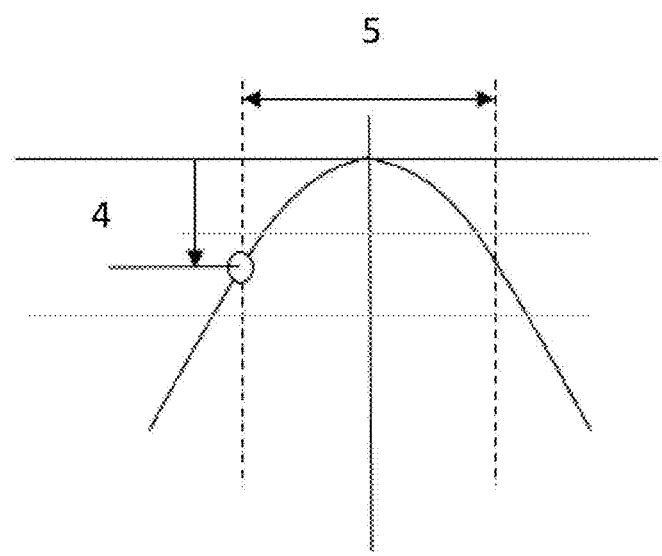
FIG. 6 shows a schematic representation of the profile of the contact surface of the segment of the piston ring according to the present invention, showing the clearance and the recess.

As can be seen in FIGS. 4 to 6, the piston ring according to the present invention consists of a spacer or expansion element and two segments, wherein the segments 1 have a radial dimension 3 between 1.50 mm and 1.90 mm, and a height 2 between 0.30 mm and 0.40 mm, a convex profile with recesses 4 between 0.015 mm and 0.030 mm, and a clearance 5 of 0.150 mm, wherein the segments are wound by means of a matrix box device 10 and of a roller, wherein the ring has a circularity, expressed in the form of a decomposition in a Fourier series, with amplitude N not greater than 0.10 u for orders higher than 10.

Interestingly, this configuration of the piston ring allows a more aggressive scraping of oil film, which implies that the quantity of oil remaining on the walls of the cylinder is reduced and, hence, also the overall oil consumption of the engine.

Another advantage is that the smaller amplitudes of the individual forms of each order of the Fourier series result in a more circular ring, with fewer deformations on the external surface and, hence, with an improved constructive configuration of the piston ring, and a more continuous contact with the skirt of the cylinder.

As already mentioned, the initial process of winding the segment is of extreme importance to realize an improved constructive configuration of the piston ring, in such a way that the symmetry and offset of the profile trim can be guaranteed.

One notices that the matrix box device 10, in comparison to the state of the art, substitutes two of the rollers of the conventional winding system, being a device of the guiding type, a device that receives the segment and guides it to the roller where the lining of the segment takes place in accordance with the diameter of the cylinder of the engine.

In this process of receiving and guiding, the function of the matrix box device is to prepare and condition the segment for improved winding and, consequently, improved constructive configuration of the piston ring.

As can be seen in FIG. 4, before the actual winding is carried out by the roller, the segment is introduced into one end of the matrix box device 10, after which it runs through a channel of the device and leaves the device at the other end, guided by the roller.

More specifically during the passage through the channel of the matrix box device 10, the segment presents the necessary conditions for improved winding of the segment.

Therefore, after the segment runs through the matrix box device, after the winding phase and all the machining phases, can be observed a Fourier amplitude level and a circularity that are even lower than those observed after steadily rolling the segment, most conveniently resulting in a ring with a circularity, expressed in a decomposition form of a Fourier series with amplitude N not greater than 0.10 μm for orders higher than 10.

Figure 7:
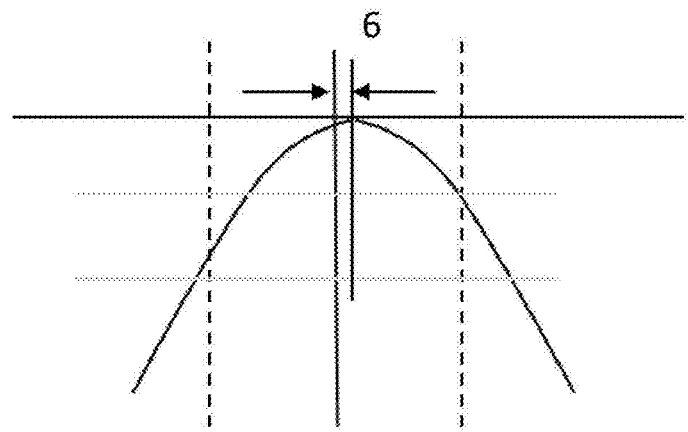
FIG. 7 shows a schematic representation of the profile of the contact surface of the segment of the piston ring according to the present invention, showing the offset of the top.

As can be seen in FIG. 7, in which a preferred but in no way limiting embodiment can be seen, the piston ring according to the present invention can comprise a top with a horizontal offset 6 of up to 0.005 mm, preferably smaller than 0.002 mm.

Figure 8:
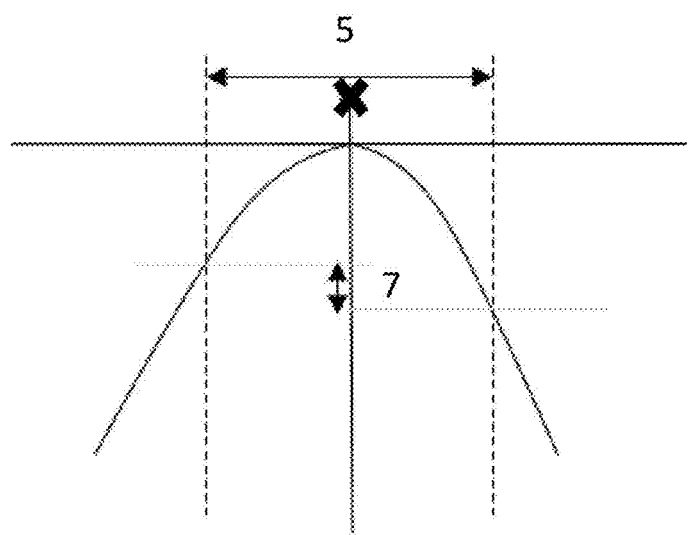
FIG. 8 shows a schematic representation of the profile of the contact surface of the segment of the piston ring according to the present invention, showing the clearance and the asymmetry of the recess.

As can be seen in FIG. 8, in which a preferred but in no way limiting embodiment can be seen, the piston ring according to the present invention can comprise a top with an asymmetry of the sides of the profile with respect to the base 7 of up to 0.010 mm, preferably up to 0.003 mm.

Preferably, the values for the vertical offset and for the asymmetry of the top are minimal compared to the state of the art, giving the piston ring according to the invention an improved contact surface.

It has to be mentioned that the aforementioned values are the result of the improved winding, as the latter makes for a shorter machining time during the production process of the ring.

Moreover, the object of the present invention can comprise a PVD and/or a DLC layer on the contact surface of at least one segment, as well as a base material made of nitrated stainless steel, or a base material made of carbon steel.

Furthermore, in order to show the improved constructive configuration of the ring, or in other words the lower levels of circularity and amplitude of the Fourier orders of the segments, FIG. 9 shows a representation of an analysis of the Fourier orders after the winding of the piston ring according to the present invention, as well as of a piston ring according to the state of the art.

As can be seen, in the piston ring according to the present invention, the Fourier level was reduced considerably after the initial winding operation of the segment by means of the matrix box device 10 and a roller, compared to the Fourier level of rings according to the state of the art.

This way the object of the present invention interestingly distinguishes itself from the state of the art, as the lower the Fourier amplitudes, the more improved the constructive configuration of the piston ring will be.

Moreover, the improved constructive configuration of the piston ring according to the present invention makes it possible to use a higher superficial pressure against the cylinder skirt, allowing a lower oil consumption during the run-in phase of the engine.

The same applies to the emissions of particulate material in the case of a new engine, in which the results of the emissions are shown to be more robust and lower in comparison to the initial emission of particulate material.

Figure 10:
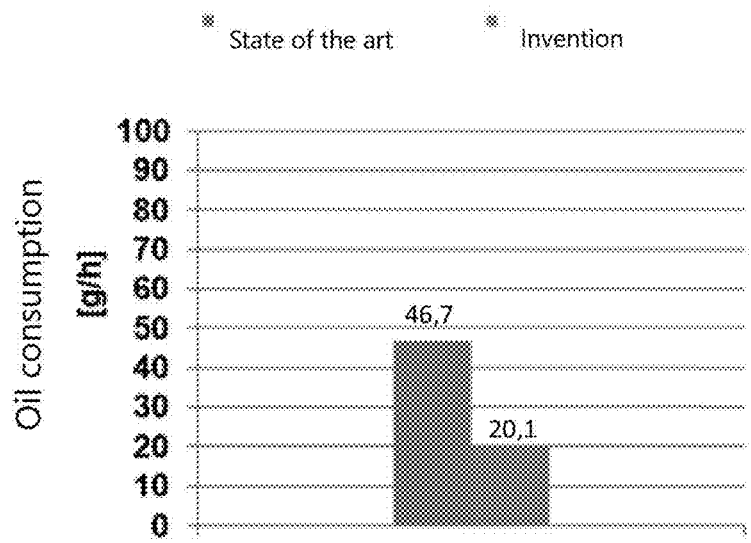
FIG. 10 shows a comparative graphic of the oil consumption of a piston ring according to the present invention and a piston ring according to the state of the art.

Preferably, and as can be seen in FIG. 10, engine tests carried out to determine the oil consumption of a diesel internal combustion engine show that the piston ring according to the present invention led to a reduction of more than 50% in oil consumption in comparison to piston rings according to the state of the art.

Figure 11:
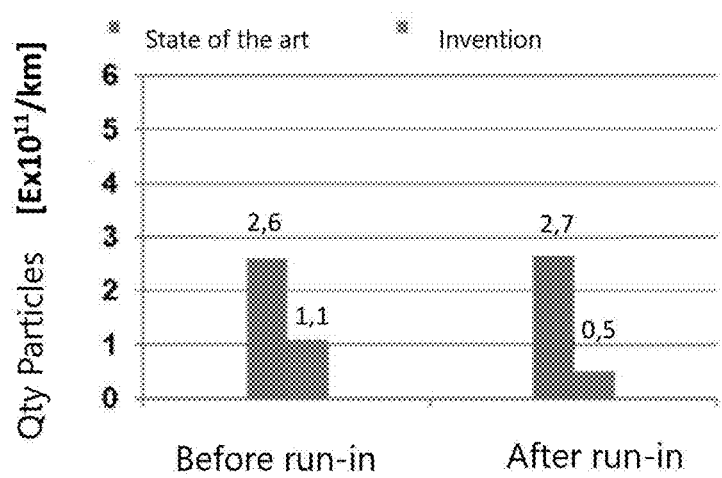
FIG. 11 shows a comparative graphic of the quantity of emitted particles before and after running in the piston ring according to the present invention, and a piston ring according to the state of the art.

Moreover, as can be seen in FIG. 11, engine tests carried out to evaluate the emission of particulate material of a diesel internal combustion engine show that the piston ring according to the present invention led to a 58% reduction in emitted particulate material, at the beginning of the test, and to a 72% reduction with the engine run in, and this in comparison to piston rings according to the state of the art.

Having described here a practical preferred example of the invention, it goes without saying that the scope of the present invention comprises other possible variations, wherein the scope of the invention is only limited by the attached claims, including the possible equivalents.

The invention claimed is:

1. A piston ring, comprising:
a spacer or expansion element; and
two segments; wherein the spacer or expansion element is disposed between the two segments;
wherein the segments have a radial dimension between approximately 1.50 mm and approximately 1.90 mm and a height between approximately 0.30 mm and approximately 0.40 mm;
wherein the segments have a convex profile with (i) recesses each having a radial depth of between approximately 0.015 mm and approximately 0.030 mm at at least one location and (ii) a clearance of approximately 0.150 mm;
wherein a first recess of the recesses is defined between a first axial point of the convex profile and a vertex of the convex profile, and a second recess of the recesses is defined between a second axial point of the convex profile and the vertex of the convex profile;
wherein the radial depth of the first recess at the first axial point is 0.015 mm to 0.030 mm and the radial depth of the second recess at the second axial point is 0.015 mm to 0.030 mm;
wherein the clearance is an axial distance between the first axial point and the second axial point;
wherein the segments are wound via a matrix box device and a roller; and wherein the piston ring has a circularity, expressed in the form of a decomposition as a Fourier series, with an amplitude for orders higher than 10 which is not greater than 0.10 μm.

2. The piston ring according to claim 1, wherein the vertex has a horizontal offset up to approximately 0.005 mm, and the horizontal offset is an axial distance between the vertex and an imaginary center line disposed equidistant from the first axial point and the second axial point of the convex profile.

3. The piston ring according to claim 1, wherein an asymmetry of sides of the profile with respect to a base is up to approximately 0.010 mm, and the asymmetry of sides of the profile of up to approximately 0.010 mm is a radial distance by which the first axial point and the second axial point of the convex profile are offset from one another.

4. The piston ring according to claim 1, further comprising a PVD and/or a DLC layer on a contact surface of at least one of the two segments.

5. The piston ring according to claim 1, comprising a base material made of nitrated stainless steel.

6. The piston ring according to claim 1, comprising a base material made of carbon steel.

7. The piston ring according to claim 1, wherein the vertex has a horizontal offset less than approximately 0.002 mm, and the horizontal offset is an axial distance between the vertex and an imaginary center line disposed equidistant from the first axial point and the second axial point of the convex profile.

8. The piston ring according to claim 1, wherein an asymmetry of sides of the profile with respect to a base is up to approximately 0.003 mm, and the asymmetry of sides of the profile of up to approximately 0.010 mm is a radial distance by which the first axial point and the second axial point of the convex profile are offset from one another.

9. The piston ring according to claim 1, wherein each segment has a contact surface that defines the convex profile, and:
a PVD or a DLC layer disposed on the contact surface of at least one of the two segments.

10. The piston ring according to claim 9, wherein the convex profile is asymmetric.

11. The piston ring according to claim 9, wherein the vertex has a horizontal offset up to approximately 0.005 mm, and the horizontal offset is an axial distance between the vertex and an imaginary center line disposed equidistant from the first axial point and the second axial point of the convex profile.

12. The piston ring according to claim 11, wherein the horizontal offset is less than approximately 0.002 mm.

13. The piston ring according to claim 9, wherein the two segments comprise a base material made of nitrated stainless steel.

14. The piston ring according to claim 9, wherein the two segments comprise a base material made of carbon steel.

15. A piston ring, comprising:
a spacer; and
two segments each having (1) a radial dimension of 1.50 mm to 1.90 mm, (ii) an axial dimension of 0.30 mm to 0.40 mm, and (iii) a convex profile; wherein the spacer is disposed between the two segments;
wherein the convex profile has (i) a first axial point, (ii) a second axial point, and (iii) a vertex disposed axially between the first axial point and the second axial point;
wherein an axial distance between the first axial point and the second axial point is approximately 0.150 mm;
wherein a radial distance between the vertex and one of the first axial point and the second axial point of the convex profile is 0.015 mm to 0.030 mm; and
wherein the piston ring has a circularity, expressed in the form of a decomposition as a Fourier series, with an amplitude not greater than 0.10 μm for orders higher than 10.

16. The piston ring according to claim 15, wherein:
an axial distance between the vertex and an imaginary center line disposed equidistant from the first axial point and the second axial point of the convex profile is 0.005 mm or less; and a radial distance by which the first axial point and the second axial point of the convex profile are offset from one another is 0.010 mm or less.

17. The piston ring according to claim 15, wherein the two segments are wound via a matrix box device and a roller.

* * * * *